(12) United States Patent
Kusada et al.

(10) Patent No.: US 8,504,445 B2
(45) Date of Patent: Aug. 6, 2013

(54) METHOD AND APPARATUS FOR CENTRAL ACCOUNTING AND BILLING SYSTEM FOR ENTERPRISE EMPLOYING MOBILE FIELD SERVICE INVENTORIES

(75) Inventors: Atsuo Kusada, Mahwah, NJ (US); Arthur Wagoner, Richmond, IL (US)

(73) Assignee: Altek Solutions, LLC, Mahwah, NJ (US)

( * ) Notice: Subject to any disclaimer, the term of this patent is extended or adjusted under 35 U.S.C. 154(b) by 0 days.

(21) Appl. No.: 13/411,751

(22) Filed: Mar. 5, 2012

(65) Prior Publication Data

US 2012/0259745 A1 Oct. 11, 2012

Related U.S. Application Data

(60) Provisional application No. 61/472,524, filed on Apr. 6, 2011.

(51) Int. Cl.
*A01K 5/02* (2006.01)

(52) U.S. Cl.
CPC ........................................ *A01K 5/02* (2013.01)
USPC .................................. 705/29; 705/28

(58) Field of Classification Search
USPC .................................. 705/7.11, 22, 29, 28
See application file for complete search history.

(56) References Cited

U.S. PATENT DOCUMENTS

| 7,991,656 B1 | 8/2011 | Sacks et al. |
| 8,010,419 B2 | 8/2011 | Beringer |
| 2010/0030618 A1 | 2/2010 | Green et al. |
| 2012/0026530 A1* | 2/2012 | Tsongas et al. ............... 358/1.14 |

* cited by examiner

*Primary Examiner* — Elaine Gort
(74) *Attorney, Agent, or Firm* — Gifford, Krass, Sprinkle, Anderson & Citkowski, P.C.

(57) ABSTRACT

A central accounting and billing system for enterprises providing service and supply operations for business machines located in a plurality of customer locations employing a fleet of vehicles each carrying a trunk inventory of frequently required repair parts and supplies. An ERP system at a central location generates machine-readable identification tags which are applied to parts and services carried in each of the trunk inventories and are applied to the machines to be serviced. Smart handheld devices such as cell phones contain programs which allow the identification tags to be read and communications to be established to the central ERP system relating to transfer of goods and supplies into and out of the trunk inventory and to the businesses and also the time involved in servicing particular machines at particular businesses in order to generate bills from the central enterprise to such businesses.

7 Claims, 6 Drawing Sheets

STEP 3: USING QR CODE TAGS IN FIELD

The QR code described here has unique features:
- One or multiple number of IP addresses that connect a smart-phone automatically to multiple websites or IP addresses including ERP systems and/or PCs.
- In addition, it has a vast amount of data (approximately 4,200 alpha numeric characters) that can be automatically transmitted to ERP systems or PCs when the QR code is scanned.
- Furthermore, it will open up various dialogue windows depending on the situation when the QR code is scanned and who scanned the QR code.

EQUIPMENT QR TAG

(1) Equipment QR code is scanned by a service technician before the repair service begins.

(2) QR code automatically connects to the designated IP address of the ERP system, and automatically transmits service technician's ID, Equipment ID (model name, serial number, etc.).

(3) A service clock in the ERP system or designated PC begins to count the repair time.

(4) When the QR code is scanned again, the service clock stops and report the length of the time used for repair will be transmitted. At the same time a dialogue window opens on the screen of a smart-phone.

(5) The dialogue window may be customized. It should ask such a question as "Is service complete? YES or NO", "Read meter _____", "Messages?", etc.

(6) If an authorized customer (who has a different type of ID number) scans the Equipment Tag, his or her smart-phone is automatically connected to the designated IP address that is a different from the service technician's. The customer then can place a service call using a dialogue window.

STEP 1: QR CODE TAGS FOR TRUNK INVENTORY (SERVICE PARTS)

Fig. 4

STEP 2: QR CODE TAGS FOR EQUIPMENT (EQUIPMENT AT CUSTOMERS)

- In addition to preparing the QR code tags for the trunk inventory pars, it is preferred to prepare the QR tags for all units of the entire MIF (machines in field) that a dealer is currently servicing.
- Since the Equipment QR code works independently from Trunk Inventory QR tags, if the size of MIF is too large to prepare the QR tags at once, the number of tags may be added gradually.
- It is also possible to start the equipment QR tags with the equipment newly sold to customers.

---

(1) Down load from the ERP system the information on the equipment being currently serviced. The information must include the IP address of the ERP system, in addition to the equipment's model name (or number), serial number, version, customer name, address, installed location (such as Accounting Dept.), customer contact name with telephone number, etc.

(1-a) The equipment tag may also have the IP address of other computer (service dept., etc.). When an authorized person of the customer scans the QR tag (this person has a different type of password), he or she will be connected to the service department, for instance, and can place a service call using a dialogue box that appears in the smartphone.)

---

(2) Print out QR tags for each machine in the same manner as described in the STEP 1.

---

(3) Mail QR tags to the customers who own the equipment for which each tag was printed. Each QR tag should show the model name and its serial number in addition to the QR code so that the customer can attach each tag to the appropriate equipment. Service technicians and/or sales people may bring the QR tags to each customer and help attach the tag to the equipment.

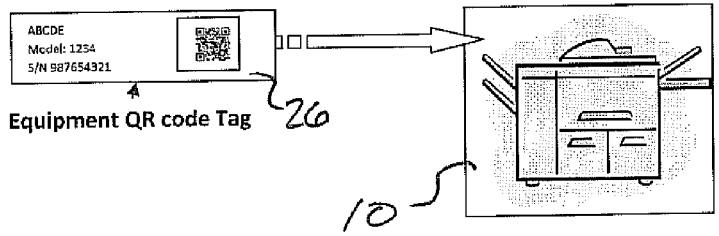

Fig. 5

STEP 3: USING QR CODE TAGS IN FIELD

---

The QR code described here has unique features:
- One or multiple number of IP addresses that connect a smart-phone automatically to multiple websites or IP addresses including ERP systems and/or PCs.
- In addition, it has a vast amount of data (approximately 4,200 alpha numeric characters) that can be automatically transmitted to ERP systems or PCs when the QR code is scanned.
- Furthermore, it will open up various dialogue windows depending on the situation when the QR code is scanned and who scanned the QR code.

---

EQUIPMENT QR TAG (1) Equipment QR code is scanned by a service technician before the repair service begins.

↓

(2) QR code automatically connects to the designated IP address of the ERP system, and automatically transmits service technician's ID, Equipment ID (model name, serial number, etc.).

↓

(3) A service clock in the ERP system or designated PC begins to count the repair time.

↓

(4) When the QR code is scanned again, the service clock stops and report the length of the time used for repair will be transmitted. At the same time a dialogue window opens on the screen of a smart-phone.

↓

(5) The dialogue window may be customized. It should ask such a question as "Is service complete? YES or NO", "Read meter _ _ _ _ _ _", "Messages?", etc.

↓

(6) If an authorized customer (who has a different type of ID number) scans the Equipment Tag, his or her smart-phone is automatically connected to the designated IP address that is a different from the service technician's. The customer then can place a service call using a dialogue window.

METHOD AND APPARATUS FOR CENTRAL ACCOUNTING AND BILLING SYSTEM FOR ENTERPRISE EMPLOYING MOBILE FIELD SERVICE INVENTORIES

CROSS-REFERENCE TO RELATED APPLICATIONS

This application claims priority of U.S. Provisional Patent Application 61/472,524 filed Apr. 6, 2011, the contents of which are incorporated herein by reference.

FIELD OF THE INVENTION

This invention relates to systems for accounting and billing for organizations employing a fleet of mobile vehicles each containing an inventory of frequently required parts and supplies for service purposes and more particularly to such a system employing smart mobile device readable ID labels for the parts and services.

BACKGROUND OF THE INVENTION

Many service and repair suppliers employ a fleet of vehicles to service their customers. These vehicles, which may be automobiles regularly driven by the service personnel or trucks supplied by the employers, generally carry a so-called "trunk inventory" in the vehicle. These trunk inventories typically consist of frequently used spare parts such as PC boards, components, and kits for maintenance purposes as well as supplies which must be delivered to the serviced accounts. Each service technician will typically engage in multiple physical transactions a day involving either dispensing parts or replenishing parts in her trunk inventory, in connection with installing parts, trading parts in the field with other technicians, and replenishing the inventory from the enterprise central storage.

The value of any trunk inventory will vary depending upon the nature of the service business, but assuming a typical technician requires at least $3,000-$5,000 in parts and supplies, with a service operation of a typical dealership having at least a dozen technicians in the field, they could easily have $500,000 in trunk inventory. The multiple transactions involving the trunk inventories make it difficult to record the transactions properly, making billing and inventory reconciliation difficult.

SUMMARY OF THE INVENTION

The present invention is accordingly directed toward a computer based system that automates the process of maintaining records of trunk inventories contained in a plurality of vehicles used by service personnel as well as automating customer billing for parts and services. The computer based system can perform related tasks such as generating orders to vendors to maintain the central location inventory at a desirable level and to replenish the trunk inventories as required.

A preferred embodiment of the invention, which will subsequently be disclosed in detail, comprises an enterprise research planning (ERP) computer system at the central location. A printer associated with the ERP system generates some form of machine-readable labels, preferably QR codes, although they may be other forms of machine-readable labels such as MS tags, barcodes, or RFID transceivers.

These machine-readable labels are physically attached to the parts and supplies, or their containers, when they are received in the central inventory from outside vendors. When a code is read, typically by a smart phone, either information within the code, as is the case with QR codes, or an application program resident on the smart phone, will initiate a wireless message to the computer system, indicating the identity and/or serial number of the part and the nature of the transaction, such as initial loading into central inventory, loading into the trunk inventory of a specified vehicle, utilized in a service transaction, etc.

Preferably, each of the customer machines to be serviced is also identified by a machine-readable coded label so that transactions relating to utilization of inventory for a service transaction may be identified in terms of the machine being serviced. This allows billing to the customer for the service call time as well as the parts or supplies utilized in the service.

In a preferred embodiment of the invention, each technician carries a smart phone, tablet, or the like with an application program capable of reading the ID labels. When a technician begins a service call, the technician will use the handheld device to read indicia on the machine to be serviced which will transmit a message back to the ERP system beginning the timing of a service call. Similarly, at the completion of a service call the technician again reads the indicia of the machine which triggers a wireless message to the ERP system indicating the termination of a service call. From this information the ERP system times the service call with the timing terminated when the second message is received from the service technician. The ERP system uses this information as well as the information about the parts and supplies transferred from the trunk inventory to the service customer to bill the customer. The system also automatically adjusts the record of the trunk inventory based on these wireless messages.

The ERP system is preferably associated with a printer which can generate the necessary QR code or other product identification labels. When parts and supplies are received at the main inventory location, the system will generate a custom label for the part, containing the identification code, which will be attached to the part or its packaging. The ERP system will then augment its records of the main inventory by the parts or supplies added. The ERP system will also maintain a separate stockroom record for the trunk inventories of each of the vehicles. When a part or supply is physically transferred from the main inventory to a particular vehicle's trunk inventory, the records of both the main inventory and the specific trunk inventory will be modified. The ERP system will use the main and trunk inventory records to automatically order parts and supplies from vendors to maintain the main inventory at required levels and issue orders relative to the transfer of parts and services to the various trunk inventories. The execution of each transfer will be signaled to the ERP system by scanning the part identification codes with handheld readers as they are physically transferred.

The identification codes on the customer's equipment may include multiple IP or web addresses. The service customers will preferably be provided with software for their own smart phones which can scan a code on the equipment to automatically connect with the dealer's customer service department to place a service call or an order for supplies.

The systems of the present invention, which will subsequently be described in detail, have the capability of eliminating or greatly reducing inventory shrinkage both in trunk inventories and the central inventory. They will enable prompt time and billing to the customers and reduce inventory reserves and associated carrying charges.

BRIEF DESCRIPTION OF THE DRAWINGS

Other objects, advantages, and applications of the present invention will be made clear by the following detailed description of preferred embodiments of the invention. The description makes reference to the accompanying drawings in which:

FIG. 4 is a block diagram of the part of the system of the preferred embodiment which marks the customer's equipment subject to service with machine-readable QR codes;

FIG. 5 is a block diagram illustrating the manner in which the system of the preferred embodiment utilizes the coded labels on the machines to be serviced to provide information to the ERP system as to the timing of service.

DETAILED DESCRIPTION OF THE PREFERRED EMBODIMENT OF THE INVENTION

Many mid to large size business organizations employ computerized Enterprise Research Planning (ERP) systems. These ERPs comprise an integrated system that operates substantially in real time, without requiring periodic updates, to computerize and automate a variety of business functions such as finance and accounting functions, supply chain management, billing, and the like. These systems preferably receive real-time data and track transaction data in a variety of ways.

The present invention is broadly directed toward an automated system for tracking the inventory and services performed by organizations employing a fleet of vehicles allowing technicians to perform service and supply operations at multiple client accounts. The present invention allows information relating to these transactions to be fed back to the ERP system for maintaining inventories, billing purposes, and the like.

Figure 1:
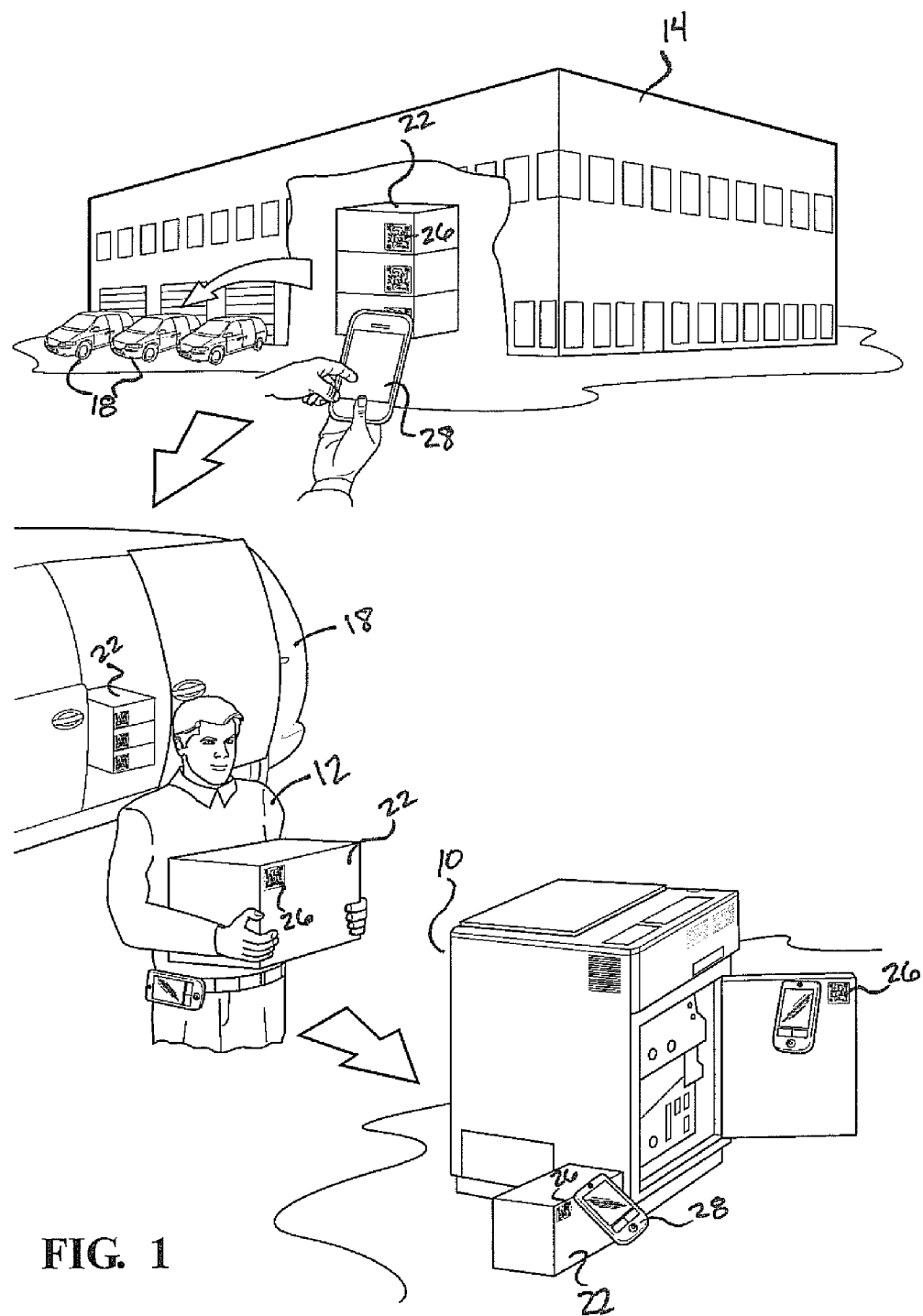
FIG. 1 is a pictorial diagram illustrating the use of a smart phone to load packages marked with machine-readable labels into the trunks of a plurality of service vehicles and a service technician moving the parts from the vehicle to a customer's machine to be serviced, which is also marked with a machine-readable code.
Figure 2:
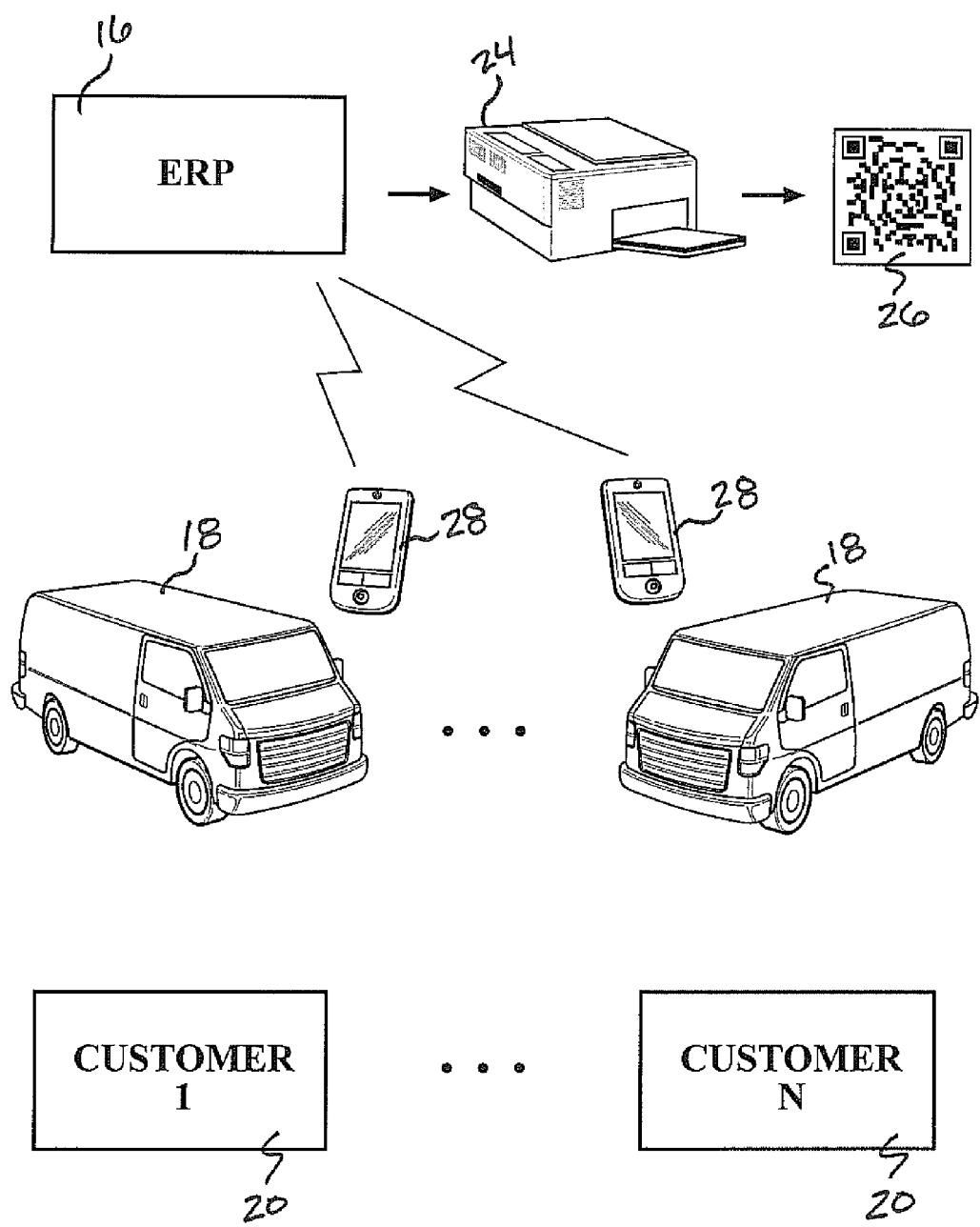
FIG. 2 is a pictorial-schematic diagram of the generation of a QR coded label by a printer associated with an ERP system and communications between smart phones carried by the drivers of service vehicles with the ERP system and the customer locations.

Referring to the drawings, the system of the present invention allows the provision of service and supply operations for a wide variety of customer machinery, such as the printer 10 illustrated in FIG. 1. These service and supply operations are performed by technicians 12 operating out of one or more central supply depots 14 which may also house a system-wide ERP system 16. The service technicians 12 employ a fleet of vehicles 18 which may constitute enterprise-owned vehicles or the service technicians' personal vehicles. These vehicles carry repair parts and supplies required by a plurality of customers 20 who own machinery such as the printer 10 which requires periodic service and resupply.

The service parts and replenishment supplies delivered by the technician to the customer locations are typically received from vendors and stored in the central location 14. They are indicated by the boxes 22.

The ERP system 16 has one or more associated printers 24 which are capable of generating coded labels 26 which are attached to each package 22 when received in the central location 14. The machine-readable package label 26 is illustrated as a QR code, which is the preferable type of label, but as has been noted other forms of machine-readable labels such as barcodes, MS tags, RFID transceivers, and the like may be employed in other embodiments of the invention. The coded labels, whether QR codes or one of the other alternative types of label, will be encoded by signals sent from the ERP system 16 to the printer, with information relating to the contents of each container 22 such as part name, model number, serial number, date received, and the like. The labels 26 are adapted to be read by a handheld reader such as the smart phone 28 carried by the service technician and others who are involved with the system. The coded labels preferably include information that will allow the readers 28 to establish wireless, typically Internet based, communications with the ERP system 16 and other elements of the system. In cases where the coded labels 26 do not contain this information, the readers 28 are typically programmed with applications that automatically contact the ERP system 16 or other elements of the present invention.

Broadly, when the containers 22 are received within the central location 14, labels 26 are prepared for them by the ERP system 16 and are physically applied to the containers 22. When the containers 22 are to be loaded into the trunk inventories of the vehicles 18, an operator utilizes a reader 28 to read the labels associated with those containers and communicate with the ERP system to decrement the records of the central location inventory and augment the records of the trunk inventories into which the packages are loaded. Similarly, when a technician 12 removes boxes 22 from a vehicle 18, the labels of the containers thus removed are read and that information is transmitted to the ERP system.

The machines 10 to be serviced are also preferably equipped with machine-readable labels 26 so that they may be read by a service technician when service begins on a machine 10, and the start time of that operation as well as the identity of the machine being serviced is transmitted to the ERP system. When the service operation ends, the operator 12 again transmits that information to the ERP system 16, preferably by again reading the label of the serviced machine 10, to mark the termination of the service time and establish the length of the service time for billing purposes.

Employees of the customers 20 may be equipped with the handheld readers 28 which will be programmed to communicate with the ERP system 16 to schedule service for the machine 10 when required.

Figure 3:
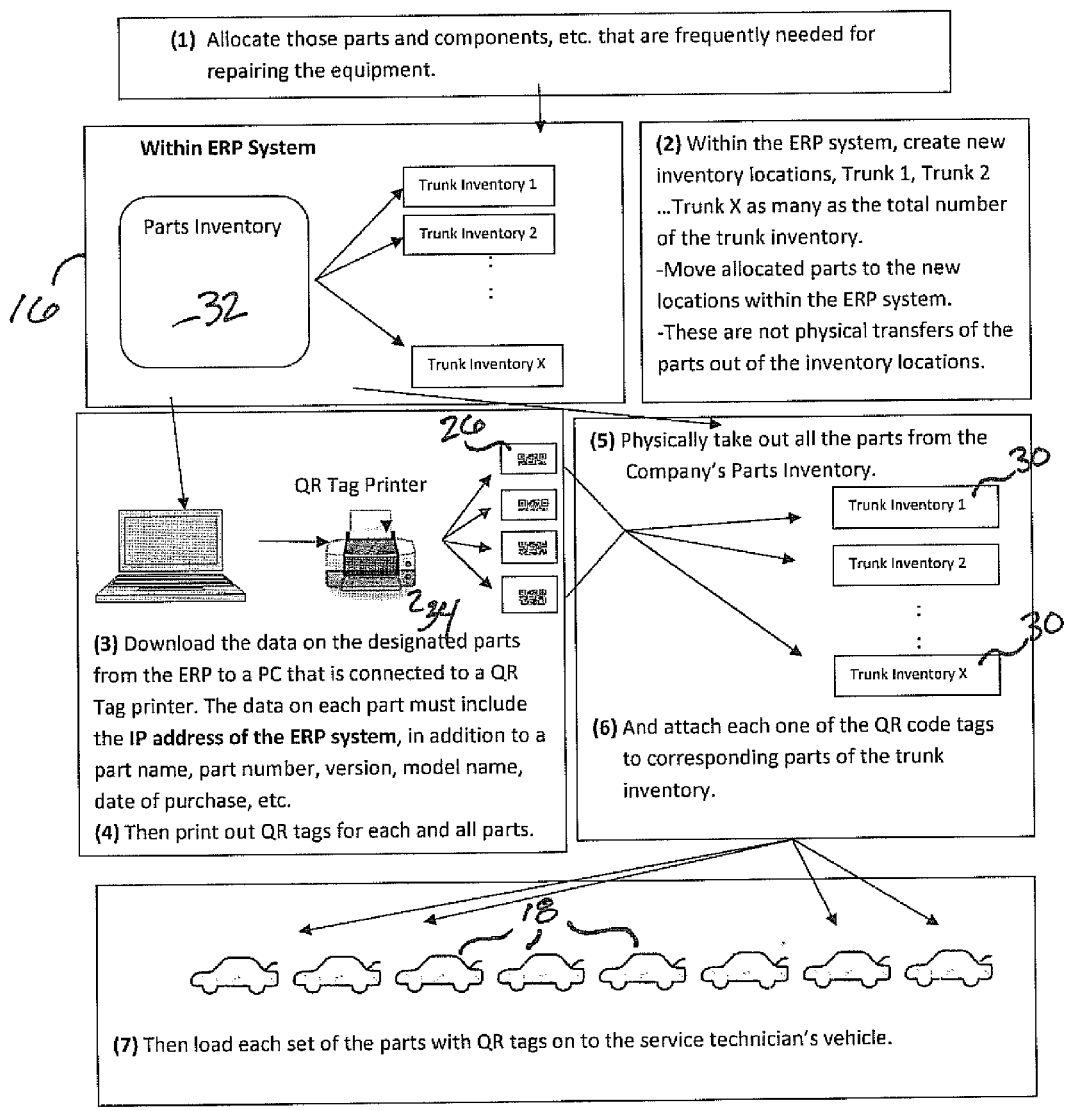
FIG. 3 is a block diagram illustrating the operation of the preferred embodiment of the invention in marking the part inventory with machine-readable labels and loading them into a plurality of service vehicles, with the ERP system tracking the loading of the parts and supplies into each of the vehicles to maintain trunk inventories.

The operation of the preferred embodiment of the invention, having thus been generally described, will be described in more detail in connection with the description of FIGS. 3-6. FIG. 3 is a flowchart illustrating the preferred manner of establishing trunk inventories for a plurality of service vehicles 18 to be used by the service technicians. The initial step (1) is to allocate those parts, components, and perishable supplies that are typically required during a service call. To prepare the ERP system 16 a plurality of memory locations 30, equal to the number of service vehicles 18, are established via software in the memory of the ERP system 16 and each memory location 30 is downloaded with data signifying the parts and supplies constituting the desirable trunk inventory. The ERP system includes a parts inventory 32 representing the contents of the warehouse within the central location 14. Next, the data on the parts and supplies to be associated with each trunk inventory is used to generate a plurality of encoded labels 26, preferably in the form of QR codes. The ERP system then controls a printer 34 which creates each of these coded labels 26. The data imprinted on the QR code will include the IP address of the ERP system to enable the handheld smart phones or the like 28 to communicate part and supply transfers within the system. It will also include an identification of the part or supply, the part number, the date of purchase of the part or delivery to the central location 14, or the like.

Next, at step (5) the parts and supplies to be loaded into the trunk inventories are physically segregated and the QR code labels 26 are physically attached to the container for each of the parts and supplies. They are then physically deposited in the vehicles 18 to establish the trunk inventories. As this is done, the QR codes 26 on each of the containers for the parts and supplies loaded into the trunk inventories are read by one of the devices 28 and the reading automatically transmits to the ERP system, typically via the Internet or a Wi-Fi system within the central location 14, the fact that these containers have actually been deposited in the trunk inventories of the vehicles 18 and the parts inventory 32 and the trunk inventory 30 locations are accordingly modified.

In an alternative embodiment of the system the containers 22 for the parts and supplies could be provided with the encoded machine-readable labels 26 when they arrive at the central location 14 and are placed in the parts inventory 32.

It is also necessary that the machine-readable tags 26 be used to mark the equipment 10 to be serviced by a particular technician and this process is outlined in FIG. 4. The codes imprinted on the labels to be applied to the customer machines to be serviced 10 will have information fully identifying the nature of the equipment 10, the customer's name and address, the location within the customer's physical facility in which the machines 10 are located, a customer contact name with telephone number, and any additional information that will be useful in tracking service for the machine 10. The label 26 to be applied to a customer machine 10 may also have the IP address of the enterprise's service department so that upon reading the code 26 associated with a business machine to be repaired or otherwise serviced, the QR code associated with the machine will cause the scanning cell phone to initiate a phone call to the service department and generate a dialog box on the screen of the smart phone which will allow a service appointment to be established.

The QR tags for these machines 10 are printed by the ERP system and either personally delivered or mailed to the customers who own the equipment 10. When machines 10 are sold to the customers by the enterprise, they will be previously equipped with the specialized machine-readable labels.

FIG. 5 illustrates the manner in which the service technician at a customer's location utilizes the tags 26 to assist in the performance of the service operation. As indicated in item (1) in FIG. 5, when the service technician is ready to begin the service operation the technician uses a handheld smart phone or the like to scan the QR code 26 attached to the equipment 10. The QR code causes the technician's cell phone to connect to the ERP system and automatically transmits the service technician's identification and the equipment identification. A clock in the system 16 then begins to time the service operation. When the service operation is completed, the technician again scans the machine-readable label 26 with the cell phone to report the termination of the service operation to the ERP computer 16. Preferably a dialog window then opens on the screen of the smart phone 28 in which questions relating to the service operation such as the meter reading, etc. may be answered.

As has been noted, if an authorized customer whose phone is equipped with a different ID number scans the tag 26, rather than being connected directly to the ERP system 16 he will be connected to the enterprise service department so he can request a service call using a dialog window that appears on his cell phone screen.

Figure 6:
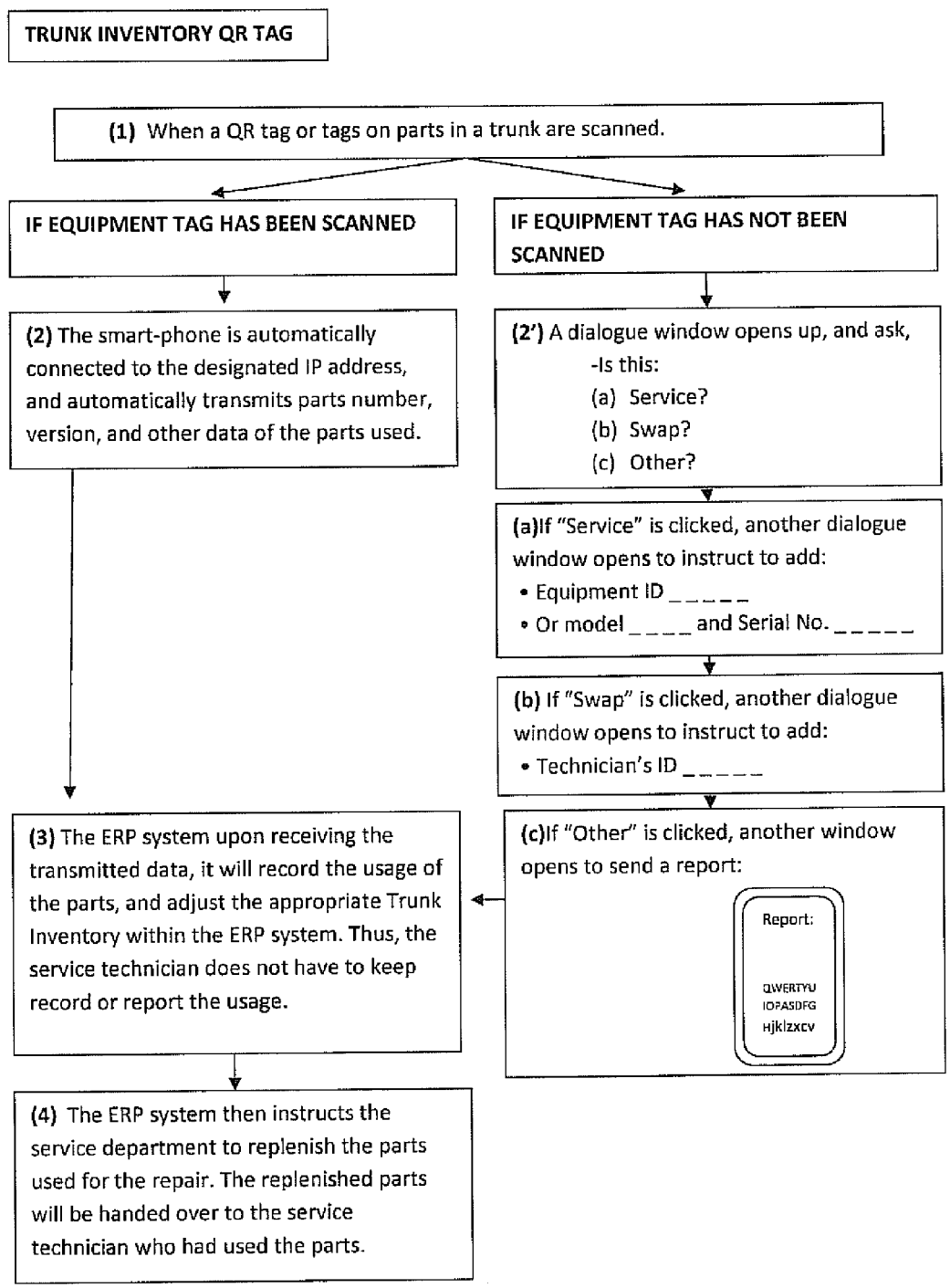
FIG. 6 is a block diagram indicating the use of the preferred embodiment of the invention to transmit information to the ERP system which will maintain records of the trunk inventories and issue orders for maintaining proper levels of the trunk inventories.

As illustrated in FIG. 6, when a service technician removes a container 22 bearing a machine-readable code 26 from his trunk inventory, the technician will scan the label with his smart phone 28 to automatically connect to the ERP system 16 and transmit the identification information relating to the parts being used.

The ERP system will modify its records of the trunk inventory and record the fact that parts or supplies have been delivered to a customer and make charges to the customer for that delivery. The ERP system 16 periodically sends a message to the service department to replenish the parts or supplies removed from the trunk inventory so as to bring the trunk inventory up to the standard allocation.

In the event that the technician 12 has not scanned a QR code 26 on a machine 10 within the customer's premises, a dialog window inquires as to the nature of the removal such as "service", "swap with another technician", or other. If "service" is indicated, another dialog window opens in which the technician may enter the identification of the machine 10 being serviced, or if "swap" is indicated a dialog window will open in which the identification of the technician to whom the part has been transferred may be entered. Again, the trunk inventory records within the ERP system 16 are modified and if the parts or supplies are provided to a customer, billing is initiated. Again, as in step (3), the ERP system will automatically adjust its inventory records and take action to replenish a technician's trunk inventory.

The system of the present invention thus integrates the technician's activities with the basic inventory and accounting records to automate the recordkeeping and billing in such a way as to maintain required inventories and generate appropriate billing and order statements.

The invention claimed is:

1. A system for maintaining and servicing machines located at a plurality of customer locations, by service technicians, comprising:
    a central inventory storing quantities of parts and supplies required to service and maintain said machines;
    a plurality of service vehicles each having a trunk inventory of parts and/or supplies for the maintenance and service of said machines;
    a central computer based ERP system operative to maintain records of the parts and supplies constituting the contents of said central inventory and the trunk inventories in each vehicle;
    machine-readable identification tags attached to the parts and/or supplies contained in the central inventory and each trunk inventory;
    machine-readable identification tags attached to each of the machines to be serviced;
    all of the machine-readable identification tags bearing information identifying the parts and/or supplies bearing the identification tags and data which will automatically initiate phone messages to said ERP system when the machine-readable identification tags are read by cellular phones; and
    cellular phones for use by said service technicians allowing a service technician, visiting a customer location including a machine requiring maintenance and/or service to read the machine-readable identification tag attached to said serviced machine at the beginning and end of a service call to transmit information to said ERP system relative to the time spent on the service call and the parts and/or supplies transferred by the technician from said service technician's vehicle's trunk inventory to said maintained and serviced machine.

2. The computer based inventory accounting system of claim 1, wherein the ERP system is operative to generate orders to vendors based on the records of the central inventory records.

3. The computer based inventory accounting system of claim 1, wherein the ERP system is operative to generate transfer orders for service parts and/or supplies from the central inventory to the trunk inventories to maintain the trunk inventories at predetermined levels.

4. The system of claim 1, wherein the machine-readable identification tags constitute QR coded labels.

5. The system of claim 1, wherein phone messages initiated by reading said identification tags attached to particular machines being maintained and serviced at the beginning and end of a service period are timed by the ERP system to generate billing to the business maintaining such machine for the service and maintenance.

6. The system of claim 5, wherein the ERP system utilizes information received from said cellular telephones to generate billing to customers for the delivery of parts and/or supplies and for service operations.

7. The system of claim 1, wherein the cellular telephones include displays and the reading of an identification tag by the cellular phone generates a dialog window on the screen of the phone.

* * * * *